(12) United States Patent
Ben Yehuda et al.

(10) Patent No.: US 9,590,685 B1
(45) Date of Patent: Mar. 7, 2017

(54) SMARTPHONE CASE WITH FOLDABLE SELFIE HOLDER

(71) Applicants: Iftach Ben Yehuda, Bitan Aharon (IL); Yariv Ben-Yehuda, Bitan Aharon (IL)

(72) Inventors: Iftach Ben Yehuda, Bitan Aharon (IL); Yariv Ben-Yehuda, Bitan Aharon (IL)

( * ) Notice: Subject to any disclaimer, the term of this patent is extended or adjusted under 35 U.S.C. 154(b) by 0 days.

(21) Appl. No.: 15/157,465

(22) Filed: May 18, 2016

(51) Int. Cl.
  *G03B 17/00* (2006.01)
  *H04B 1/3888* (2015.01)
  *A45C 11/00* (2006.01)
  *G03B 17/56* (2006.01)

(52) U.S. Cl.
  CPC ........... *H04B 1/3888* (2013.01); *A45C 11/00* (2013.01); *G03B 17/561* (2013.01); *A45C 2011/002* (2013.01)

(58) Field of Classification Search
  USPC ........................................................ 396/420
  See application file for complete search history.

(56) References Cited

U.S. PATENT DOCUMENTS

| | | | | |
|---|---|---|---|---|
| 6,751,473 B1* | 6/2004 | Goyal | ................. | H04M 1/0247 348/E7.082 |
| 7,706,673 B1* | 4/2010 | Staudinger | ............. | F16M 11/06 348/211.2 |
| 9,332,170 B1* | 5/2016 | Khalili | ................. | H04N 5/2251 |
| 9,386,832 B2* | 7/2016 | Elgan | ..................... | A45C 11/00 |
| 2016/0033074 A1* | 2/2016 | Drakos | .................. | F16M 11/06 248/122.1 |
| 2016/0044227 A1* | 2/2016 | Johnson | ............... | G03B 17/561 348/211.2 |
| 2016/0070155 A1* | 3/2016 | Alster | .................. | G03B 17/561 396/420 |
| 2016/0070156 A1* | 3/2016 | Alster | .................. | G03B 17/563 396/424 |
| 2016/0091139 A1* | 3/2016 | Levine | .................. | F16M 13/04 294/139 |

* cited by examiner

*Primary Examiner* — Rodney Fuller

(57) ABSTRACT

A protective apparatus adapted for covering a mobile device and having an extendable arm. The protective apparatus includes a protective apparatus sized and shaped for being attached to a camera equipped mobile device and having a back plane and first and second sides which are laterally opposing one another, a scissor mechanism compartment formed by at least one sidewall and a bottom of the backplane, a scissor mechanism adapted to be manually extended from and manually retracted into the scissor mechanism compartment along an extension axis, and when the protective apparatus is attached to the camera equipped mobile device, a back of a housing of the camera equipped mobile device is placed against a top of the back plane and the lateral sides of the housing are placed against the first and second sides.

20 Claims, 11 Drawing Sheets

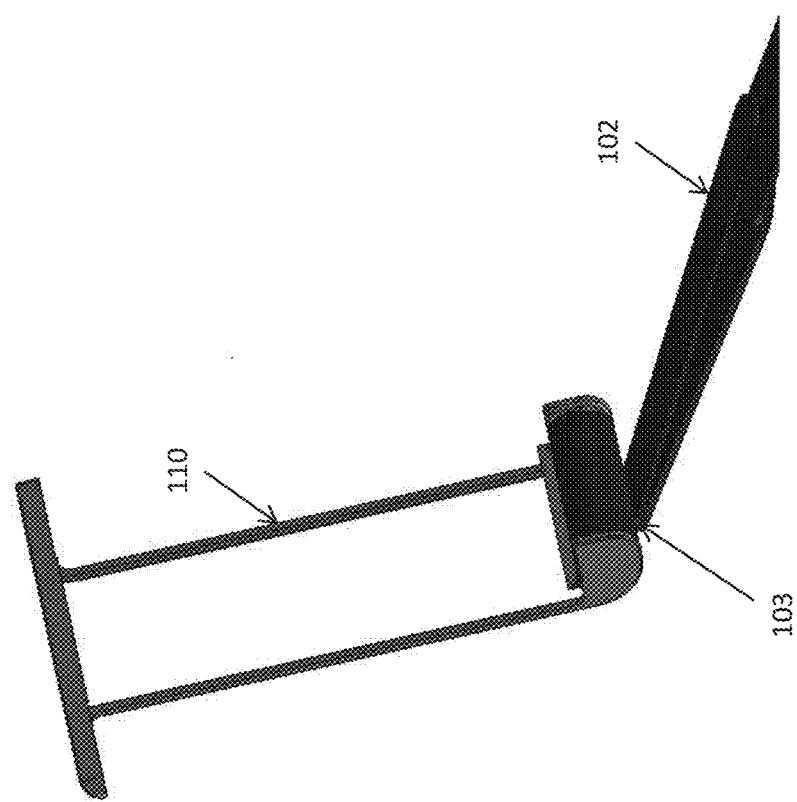

SMARTPHONE CASE WITH FOLDABLE SELFIE HOLDER

BACKGROUND

The present invention, in some embodiments thereof, relates to a device for holding a camera at a distance from a user, and, more specifically, but not exclusively, to a device having a retractable arm attached to camera mounting structure for self photography.

Many users find that holding the camera an extended distance from themselves using a rod or other extended handle produces superior results to holding the camera equipped mobile device by hand.

Existing self photography mount devices include extendable handles, for example by a telescoping or folding mechanism. The utility of existing devices is a function not only of the ability to hold the camera equipped mobile device, but also to be sufficiently light in weight and small in size so as to be convenient to carry. Additionally, since the device is often carried in a pocket or bag, the device may damage or be damaged by other personal items. Existing solutions are often too heavy, too bulky, and/or liable to damage in a pocket or bag.

SUMMARY

According to an aspect of some embodiments of the present invention there is provided a protective apparatus adapted for covering a mobile device and having an extendable arm, comprising: a protective apparatus sized and shaped for being attached to a camera equipped mobile device and having a back plane and first and second sides which are laterally opposing one another, a scissor mechanism compartment formed by at least one sidewall and a bottom of the backplane, a scissor mechanism adapted to be manually extended from and manually retracted into the scissor mechanism compartment along an extension axis, and when the protective apparatus is attached to the camera equipped mobile device, a back of a housing of the camera equipped mobile device is placed against a top of the back plane and the lateral sides of the housing are placed against the first and second sides.

Optionally, the scissor mechanism is attached to the protective apparatus with a joint, the joint adapted to support an angular adaptation of the extension axis of the scissor mechanism in relation to the backplane.

Optionally, the joint is at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation between the scissor mechanism and the protective apparatus.

Optionally, the spring clip is attached to a proximal end of the scissor mechanism by a joint, wherein when the scissor mechanism is retracted into the scissor mechanism compartment, the spring clip is rotated on the joint and clasps around the protective apparatus side.

Optionally, the scissor mechanism compartment further comprises a back plate with an integrally formed slot, and the spring clip is stowed into the slot when clasped around the protective apparatus side.

Optionally, the scissor mechanism compartment further comprises a second sidewall laterally opposed to the sidewall, and third and fourth sidewalls laterally opposed to one another and perpendicular to the second sidewall.

Optionally, the joint holder connecting between the joint and the protective apparatus is composed of a sufficiently rigid material to prevent the joint from detaching from the protective apparatus during normal usage.

Optionally, when the scissor mechanism is extended, the spring clip is rotated on the joint forming an extension handle to the extended scissor mechanism.

Optionally, the joint attached to the spring clip is at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation between the scissor mechanism and the spring clip.

Optionally, the protective apparatus is integrally formed to encase a camera equipped mobile device chosen from a collection of camera equipped mobile devices comprising a digital camera Smartphone, an iPhone, or any other camera equipped mobile device.

Optionally, the third and fourth side of the protective apparatus are laterally opposing one another and perpendicular to the first and second sides.

Optionally, the at least one button to operate the camera equipped mobile device is located in at least one structure selected from a collection of structures comprising the scissor mechanism and the spring clip.

Optionally, the scissor mechanism is detachable from the protective apparatus.

Optionally, the scissor mechanism compartment is detachable from the protective apparatus.

Optionally, the scissor mechanism is detachable from the protective apparatus together with the scissor mechanism compartment when the scissor mechanism is retracted into the scissor mechanism compartment.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings:

FIG. 4A illustrates a close up simplified isometric view of a protective apparatus joint attached to a joint holder and to a scissor mechanism, in accordance with an embodiment of the present invention;

DETAILED DESCRIPTION

Figure 1:
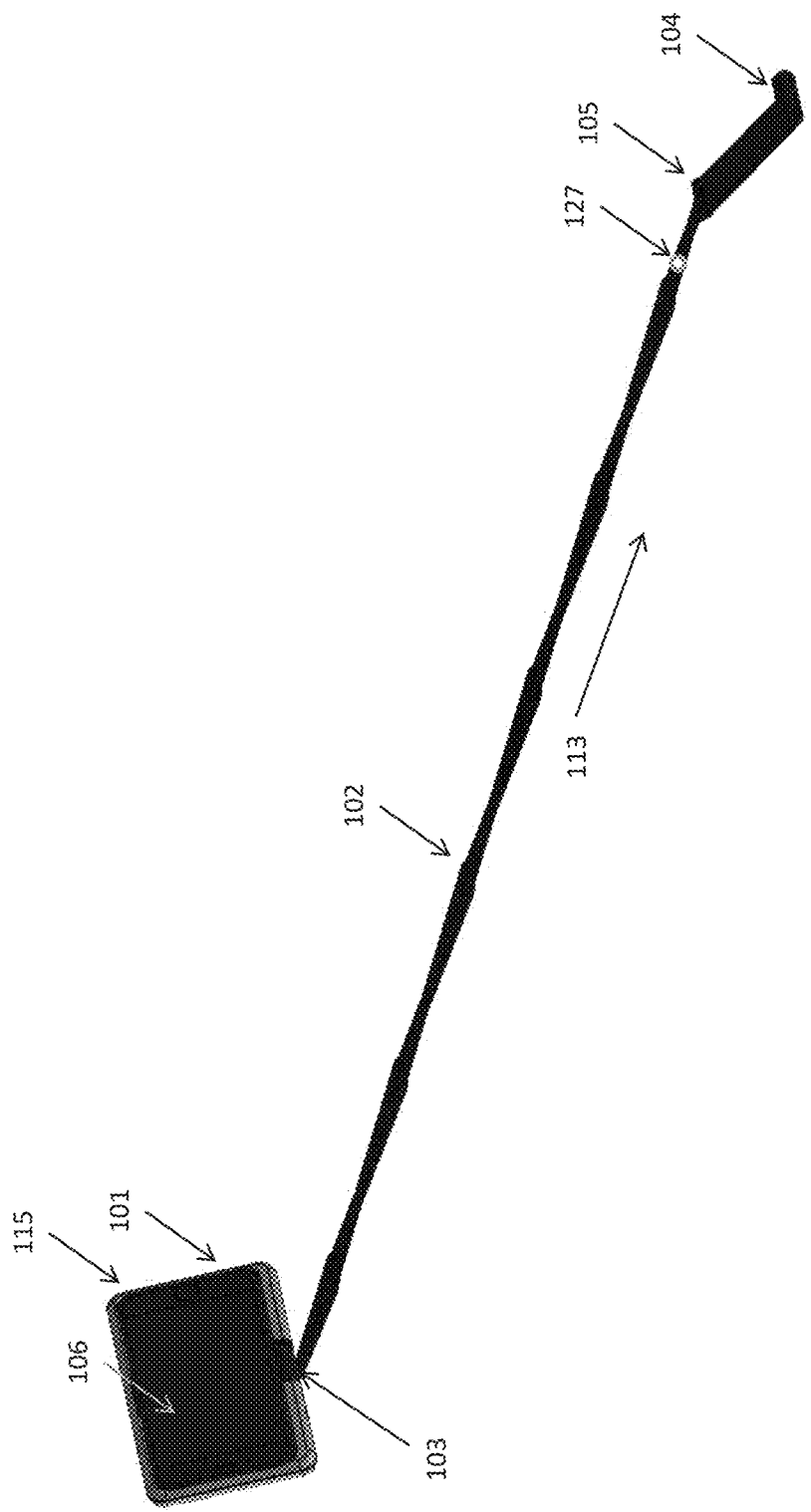
FIG. 1 illustrates a simplified view of a camera equipped mobile device, protective apparatus, and scissor mechanism, in accordance with an embodiment of the present invention.

The present invention, in some embodiments thereof, relates to a retractable device for holding a camera equipped device at a distance from a user, and, more specifically, but not exclusively, to an extendable scissor mechanism attached to a camera mounting structure for self photography.

Self photography is best executed when the camera equipped mobile device is secured in a protective apparatus and held a distance from the user by an extension device. Existing solutions include telescoping and/or foldable handles, which may be attached to a protective apparatus. However, when a telescoping or foldable handle is integrated with a protective apparatus, the handle may protrude from the rectangular form factor of the camera equipped device. The protruding handle may be damaged by or cause damage to other personal items in a pocket, bag, or purse. Existing telescoping and/or folding handles also add bulk and weight to a camera equipped device, which detracts from the user comfort and convenience.

The present invention, in some embodiments thereof, comprises a protective apparatus that protectively covers a camera equipped mobile device and includes a scissor mechanism compartment with a scissor mechanism that can be extended from the scissor mechanism compartment.

Optionally, the protective apparatus is formed to hold a specific camera equipped mobile device, for example an Apple iPhone 6S or a Samsung Galaxy 7. The protective apparatus may be formed from a flexible material, for example silicone, and attach around sides and back of the camera equipped mobile device without blocking the front screen or the imager sensors of the camera equipped mobile device. When the scissor mechanism is extended, the camera equipped mobile device is located at a distal end of the scissor mechanism and a handle is formed at the proximal end of the scissor mechanism. In such a manner, a user can stably hold the camera equipped mobile device at a distance from his palm, while taking a picture using sensors of the camera equipped mobile device.

Optionally, the scissor mechanism may be attached to the protective apparatus by a joint, allowing the protective apparatus to be rotated relative to the scissor mechanism.

Optionally, a scissor mechanism compartment is integrally formed along a back of the protective apparatus.

Optionally, as the scissor arms of the scissor mechanism are spread along the extension axis, the thickness of the scissor mechanism can be thinner than existing extension mechanisms for extending to a similar distance, for example telescoping and/or folding mechanisms. When retracted, telescoping and/or folding mechanisms by design have multiple overlapping parts that add to thickness. The scissor arms are pivotally connected together in a criss cross "X" pattern such that an assembled scissor mechanism may be only twice the thickness of the individual scissor arms.

In some embodiments of the present invention, when the scissor mechanism is retracted into the scissor mechanism compartment, the protective apparatus has a form factor that is substantially flat on all sides and substantially similar in shape to the camera equipped mobile device. When the protective apparatus is stowed, for example in a pocket, purse, or a belt pouch, the scissor mechanism may be enclosed in the scissor mechanism compartment, which protects both the scissor mechanism from becoming damaged and/or causing damage to other personal items, for example keys and eye glasses.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Aspects of the present invention are described herein with reference to flowchart illustrations and/or block diagrams of methods, and apparatus (systems) according to embodiments of the invention.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which illustrates a simplified isometric view of protective apparatus 101 and scissor mechanism 102, in accordance with an embodiment of the present invention. Protective apparatus joint 103 connects between scissor mechanism 102 and protective apparatus 101. FIG. 1 shows a front side 115 of protective apparatus 101, and scissor mechanism 101 is shown in an extended state along extension axis 113.

Optionally, camera equipped mobile device 106 is mounted within protective apparatus 103, as shown in FIG. 1.

Optionally, protective apparatus 101 is integrally formed to encase a camera equipped mobile device chosen from a collection of camera equipped mobile devices comprising a digital camera, a Smartphone, an Apple iPhone, or any other camera equipped mobile device.

Optionally, spring clip 104 is connected by spring clip joint 105 to a proximal end of scissor mechanism 102. Spring clip 104 may be rotated on spring clip joint 105 relative to scissor mechanism 102, for example to form an extension handle to scissor mechanism 102 for a user to hold. Optionally, as described below, when scissor mechanism 102 is retracted into a scissor mechanism compartment, spring clip 104 may be rotated on spring clip joint 105 to clip around a side of protective apparatus 101 and/or a scissor mechanism compartment.

Optionally, protective apparatus joint 103 may be at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation of scissor mechanism 102 relative to protective apparatus 101.

Optionally, spring clip joint 105 may be at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation scissor mechanism 102 relative to protective apparatus 101.

Optionally, when a user holds spring clip 104 and/or a proximal end of scissor mechanism 102, protective apparatus 101 may be rotated on protective apparatus joint 103 to point at an object of photography, for example the user or scenery.

Figure 2:
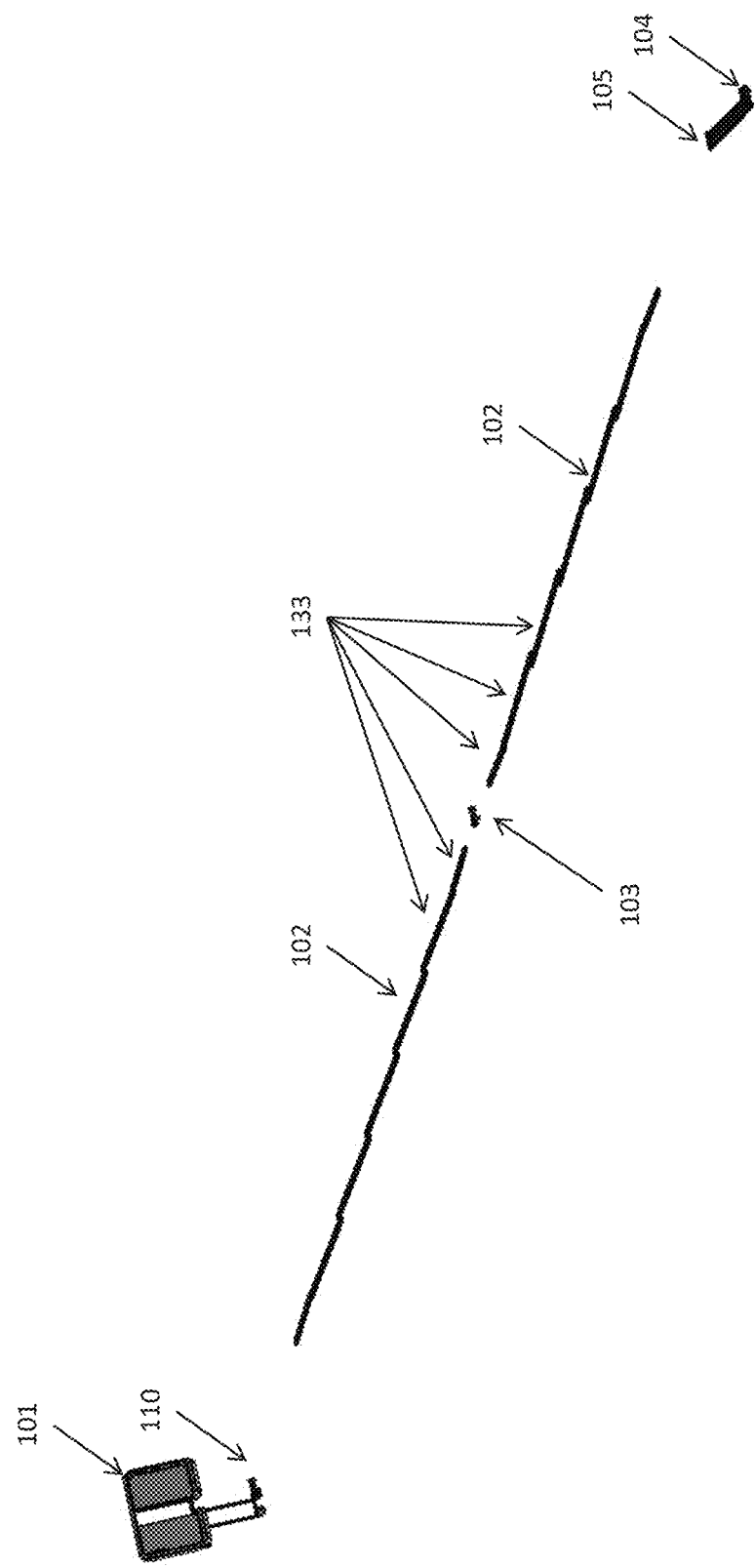
FIG. 2 illustrates a simplified exploded view of a protective apparatus and scissor mechanism as shown in FIG. 1, in accordance with an embodiment of the present invention.

Reference is now made to FIG. 2, an exploded simplified isomeric view of protective apparatus 101 and scissor mechanism 102, according to some embodiments of the current invention. Protective apparatus 101 is shown without optional camera equipped mobile device 106. Scissor mechanism 101 is comprised of a plurality of scissor arms 133.

Figure 3:
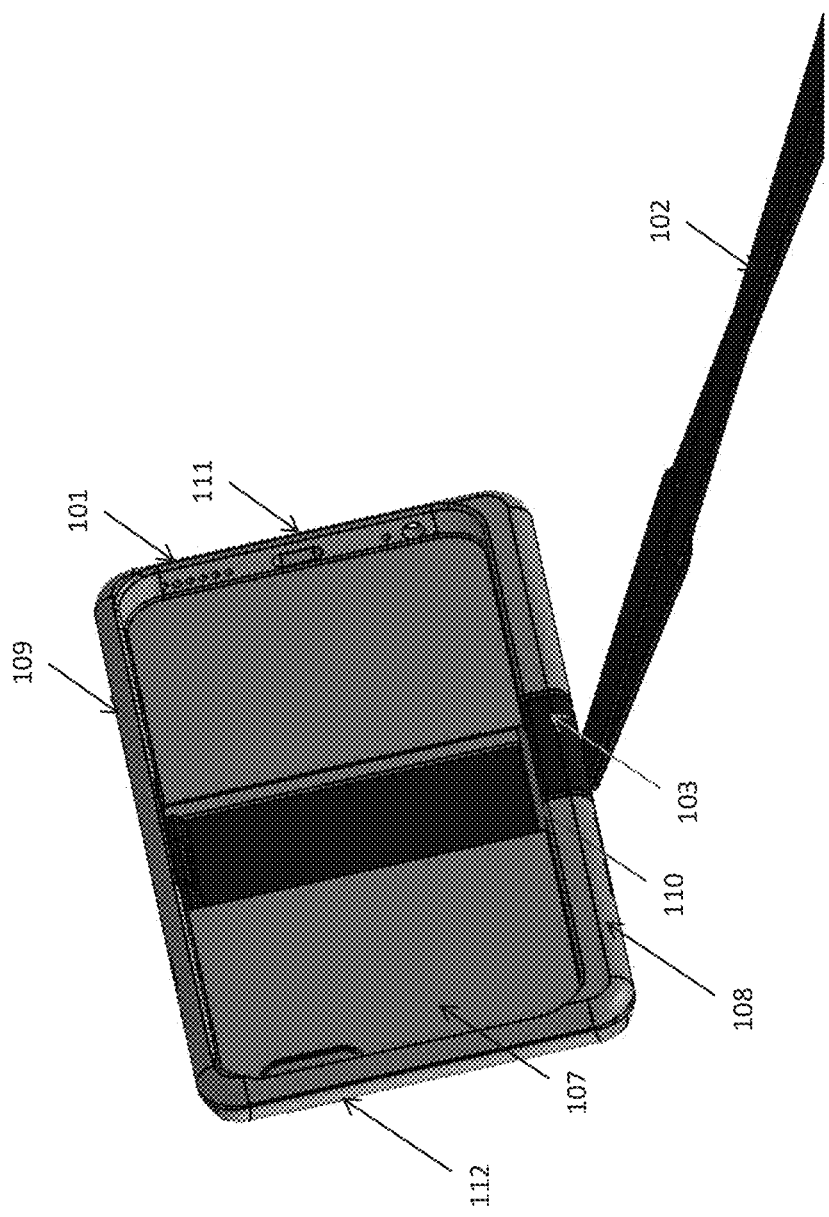
FIG. 3 illustrates a close up simplified isomeric view of a protective apparatus and scissor mechanism, in accordance with an embodiment of the present invention.

Reference is now made to FIG. 3, a close up simplified isomeric view of protective apparatus 101 and scissor mechanism 102, according to some embodiments of the present invention. Protective apparatus 101 comprises backplane 107, and at least first sidewall 108 and second sidewall 109. Optionally protective apparatus comprises third sidewall 111 and fourth sidewall 112. Camera equipped mobile device 106 is not shown in FIG. 3. FIG. 3 shows the front side of backplane 107. The back side of backplane 107 is covered by the scissor mechanism compartment, as described below.

When camera equipped mobile device 106 is attached to protective apparatus 101, a back housing of camera equipped mobile device 106 is placed against backplane 107, and two opposing lateral sides of camera equipped mobile device 106 are placed against first sidewall 108 and second sidewall 109. Optionally third and fourth opposing lateral sides of camera equipped mobile device 106 are placed against third sidewall 111 and fourth sidewall 112.

Reference is now made to FIG. 4A, a view of FIG. 3 with protective apparatus 101 removed, according to some embodiments of the present invention.

Optionally, joint holder 110 connects to protective apparatus hinge 103, and protective apparatus 101 connects to joint holder 110. Joint holder 110 may add stiffness to protective apparatus 101 at the connection to protective apparatus joint 103. Optionally, joint holder 110 is manufactured from a material that is stiff enough to keep protective apparatus 101 attached to protective apparatus joint 103 during normal usage, and flexible enough to clip over protective apparatus joint 103 during assembly.

Figure 4B:
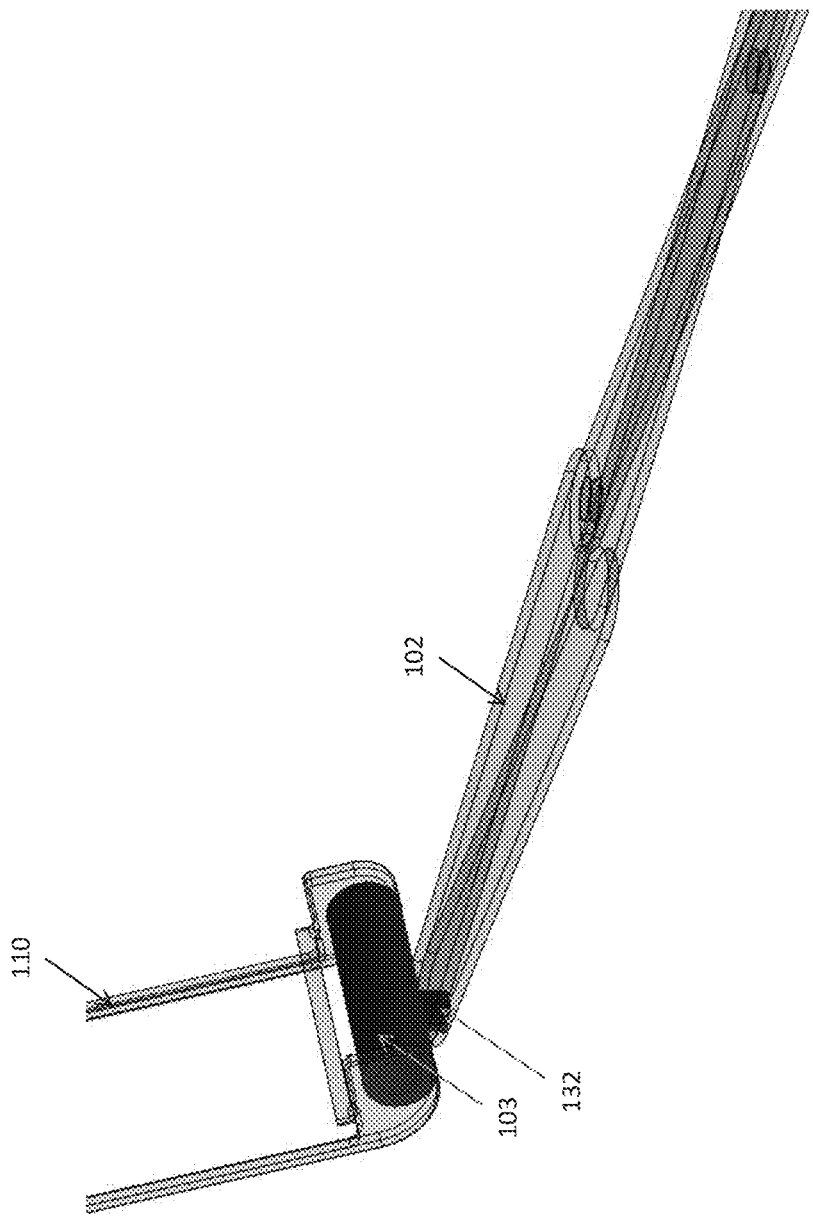
FIG. 4B illustrates a close up simplified isometric view of a protective apparatus joint attached with a transparent view of attached joint holder and scissor mechanism, in accordance with an embodiment of the present invention.

Reference is now made to FIG. 4B, a close up simplified isomeric view of protective apparatus joint 103, with transparent view of joint holder 110 and scissor mechanism 102 as shown in FIG. 4A, according to some embodiments of the present invention. Shown in FIG. 4A is scissor mechanism 102 connected to protrusion 132.

Figure 4C:
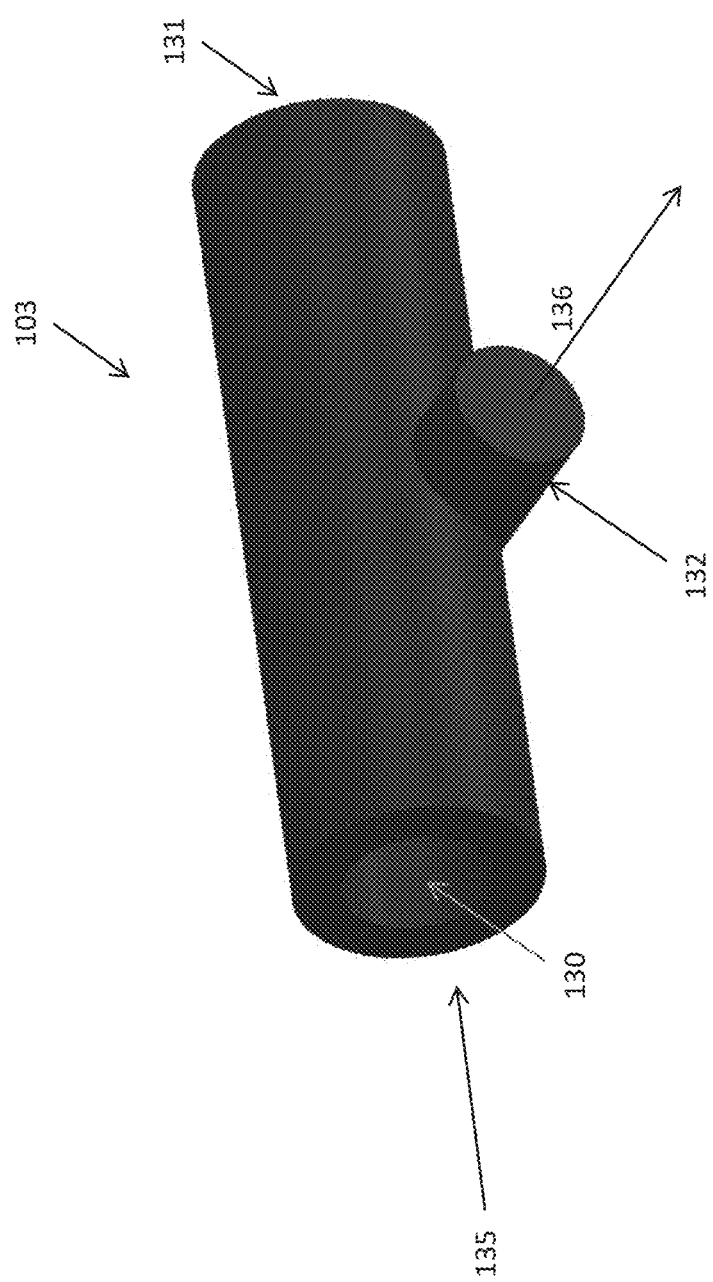
FIG. 4C illustrates a close up simplified isometric view of a protective apparatus joint, in accordance with an embodiment of the present invention.

Reference is now made to FIG. 4C, a close up simplified isomeric view of protective apparatus joint 103, according to some embodiments of the present invention.

Optionally, protective apparatus joint 103 comprises circular cavities 130 and 131 along cavity axis 135, and circular protrusion 132 along protrusion axis 136.

Optionally, cavity axis 135 and protrusion axis 136 are perpendicular to each other.

Optionally, joint holder 110 and/or protective apparatus 101 comprise circular protrusions that fit within circular cavities 130 and 131, forming a hinge that allows rotation of protective apparatus 101 relative to protective apparatus hinge 103.

Optionally, scissor mechanism 102 comprises a circular cavity at a distal end that fits around protrusion 132, forming a hinge allowing rotation of scissor mechanism 102 relative to apparatus hinge 103.

Figure 5A:
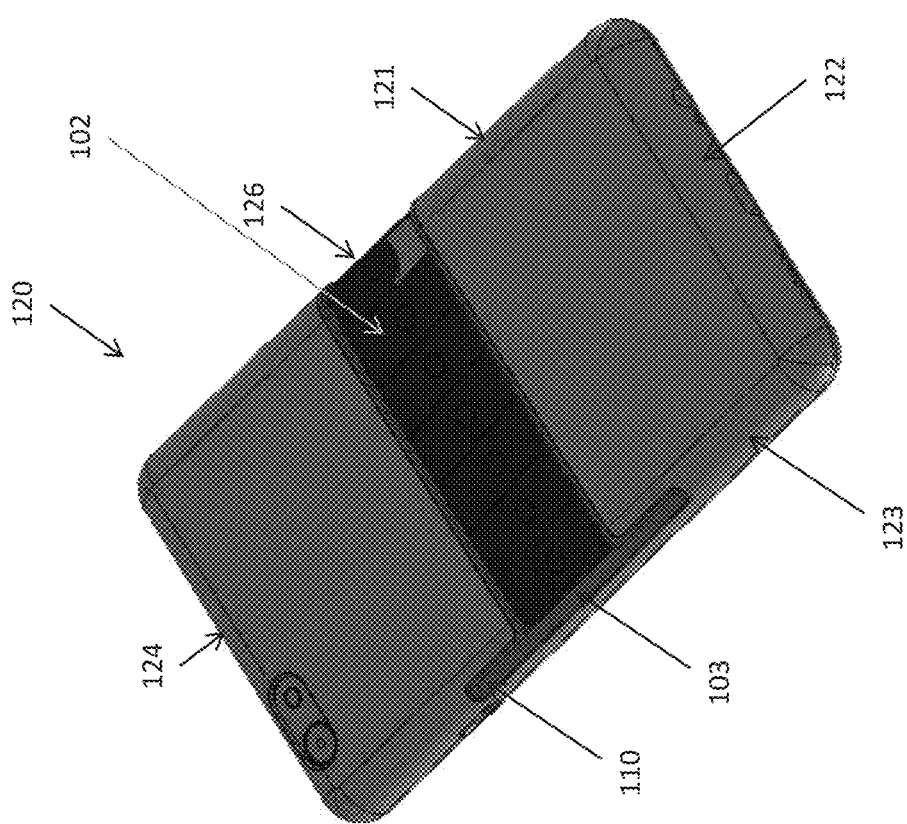
FIG. 5A illustrates a simplified isometric view of a scissor mechanism compartment, in accordance with an embodiment of the present invention.

Reference is now made to FIG. 5A, a simplified isomeric view of scissor mechanism compartment 120 which is integrally formed along a back side of backplane 107 according to some embodiments of the present invention. Scissor mechanism compartment 120 comprises the back side of backplane 107 and at least one sidewall 121.

Optionally, scissor mechanism compartment comprises second sidewall 122, third sidewall 123, forth sidewall 124, and scissor mechanism compartment backplane 125.

Optionally, scissor mechanism compartment is integrally formed with spring clip slot 126 which is adapted to stowing spring clip 105. Spring clip 104 is hidden in FIG. 5A. Scissor mechanism 102 is retracted within scissor mechanism compartment 120, as seen via spring clip slot 126.

Figure 5B:
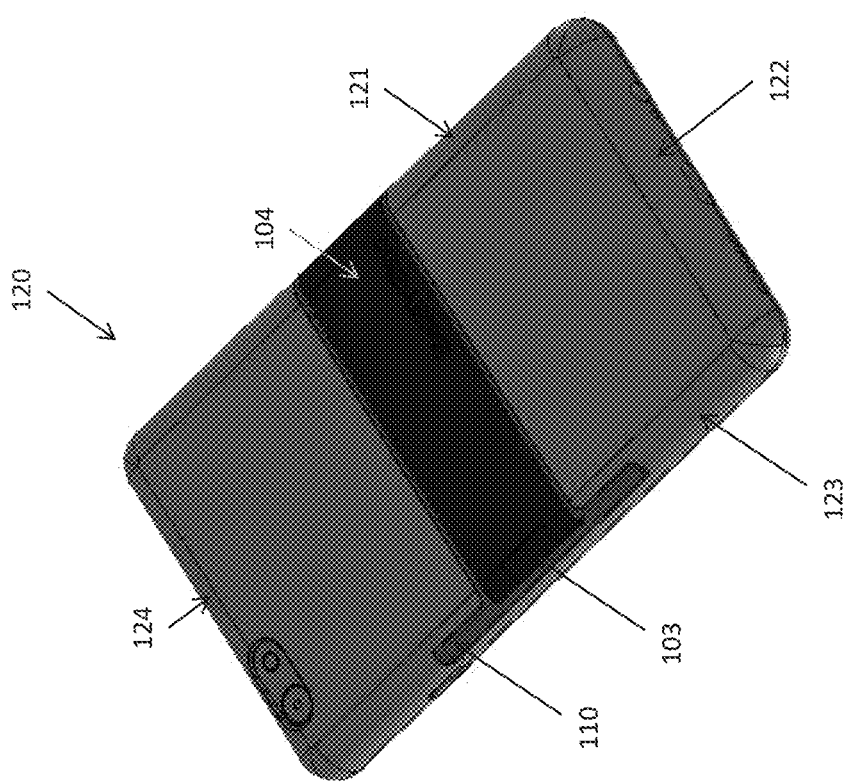
FIG. 5B illustrates a simplified isometric view of a scissor mechanism compartment with a spring clip stowed in a slot, in accordance with an embodiment of the present invention.

Reference is now made to FIG. 5B, a simplified isomeric view of scissor mechanism compartment 120 with spring clip 104 stowed in spring clip slot 125, according to some embodiments of the present invention.

Figure 6:
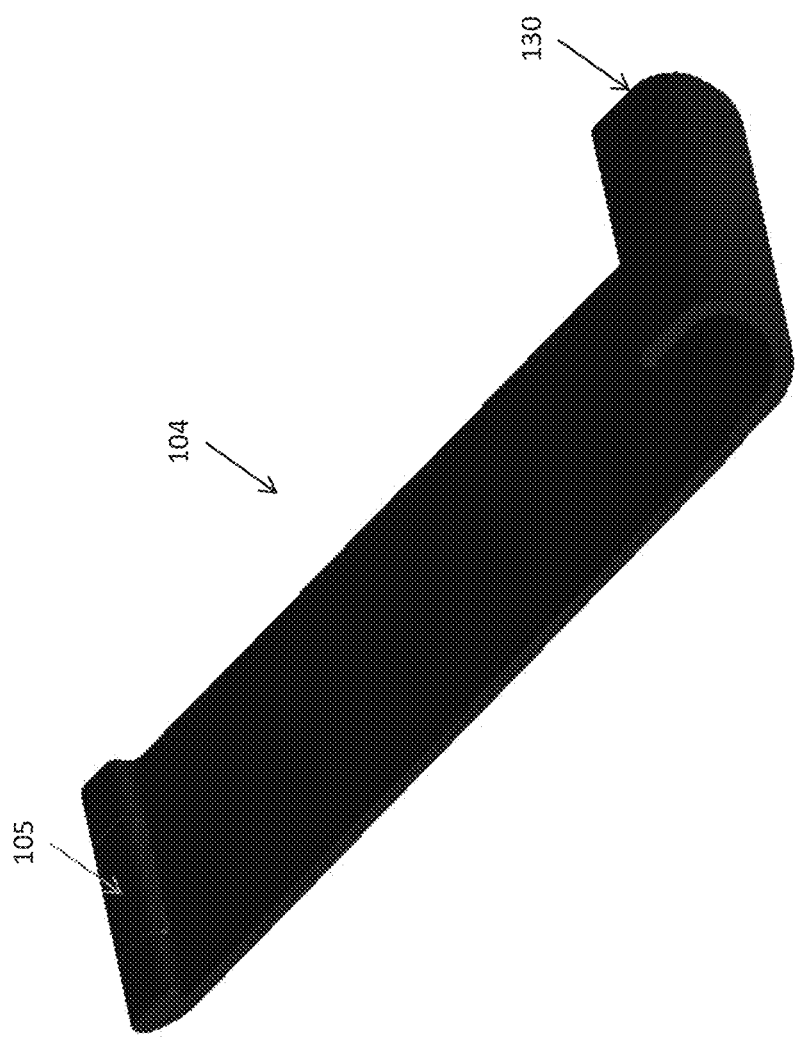
FIG. 6 illustrates a simplified isometric view of a spring clip, in accordance with an embodiment of the present invention.

Reference is now made to FIG. 6, a simplified isomeric view of spring clip 105, according to some embodiments of the present invention. Optionally, spring clip 105 comprises curved clip 130 that is formed to clip around a sidewall of scissor compartment 120, for example sidewall 121 or sidewall 122, and/or a sidewall of protective apparatus 101, for example sidewall 108 or sidewall 109.

Figure 7:
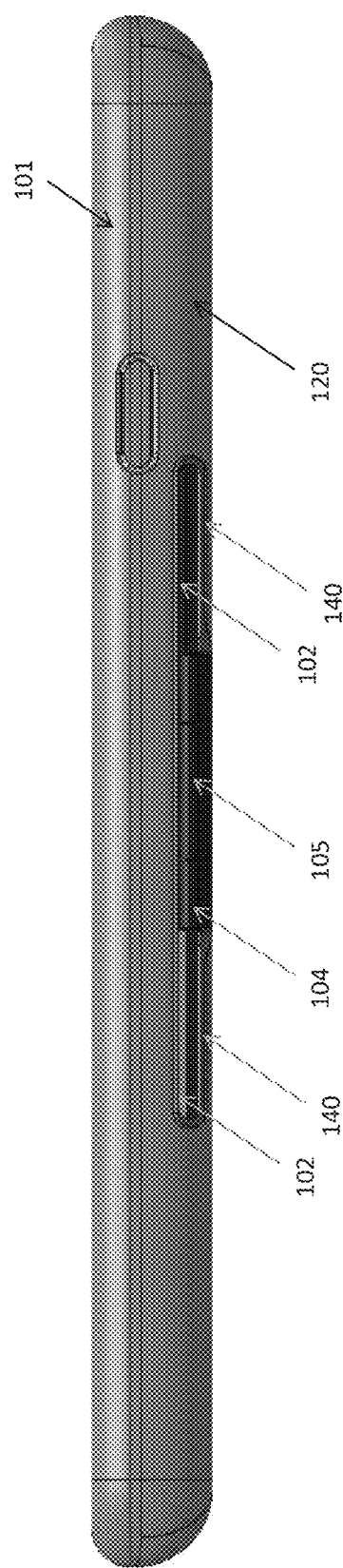
FIG. 7 illustrates a simplified isometric side view of a protective apparatus, scissor mechanism compartment, and scissor mechanism slot, in accordance with an embodiment of the present invention.

Reference is now made to FIG. 7, a side view of protective apparatus 101 and scissor mechanism compartment 120, according to some embodiments of the present invention.

Optionally, scissor mechanism compartment 120 comprises a scissor mechanism slot 140 located on one side wall, for example sidewall 121 or sidewall 123. Scissor mechanism slot 140 is formed to allow scissor mechanism 102 to retract into scissor mechanism compartment 120, as described below.

Optionally, to retract scissor mechanism 102 into scissor mechanism compartment 120, scissor mechanism 102 is rotated relative to protective apparatus 101 such that scissor mechanism 102 is parallel to and located within spring clip slot 126, and passes through scissor mechanism slot 140. Scissor mechanism 102 is then retracted into scissor mechanism compartment 120.

Optionally, scissor mechanism 102 comprises at least one button 127 to operate camera equipped mobile device 106, as shown in FIG. 1. For example, button 127 may be used to activate the taking of the self-photograph. This may be performed, for example, by initiating a command to camera equipped mobile device 106 using an electronic unit included in protective apparatus 101. The electronic unit may be, for example, a printed circuit, an electronic chip, a communication device, a processing unit and/or any other electronic element. The command may be sent, for example, by wireless communication such as wireless local area network (WLAN) protocol such as Wireless Fidelity (WiFi™) and/or a wireless personal area network (WPAN) such as Bluetooth™ protocol.

Optionally, scissor mechanism 102 may be detached from and reattached to protective apparatus hinge 103. For example, scissor mechanism 102 may be detached from and reattached to protective apparatus hinge 103 by one or more clips, latches, and/or any other type of fasteners.

Optionally, scissor mechanism compartment 120 may be detached from and reattached to protective apparatus 101. For example, scissor mechanism compartment 120 may be attached and detached from/to protective apparatus 101 by one or more clips, latches, and/or any other type of fasteners.

Optionally, scissor mechanism compartment 102 may be detached from and reattached to protective apparatus 101 when scissor mechanism 102 is retracted within scissor mechanism compartment 120.

Figure 8:
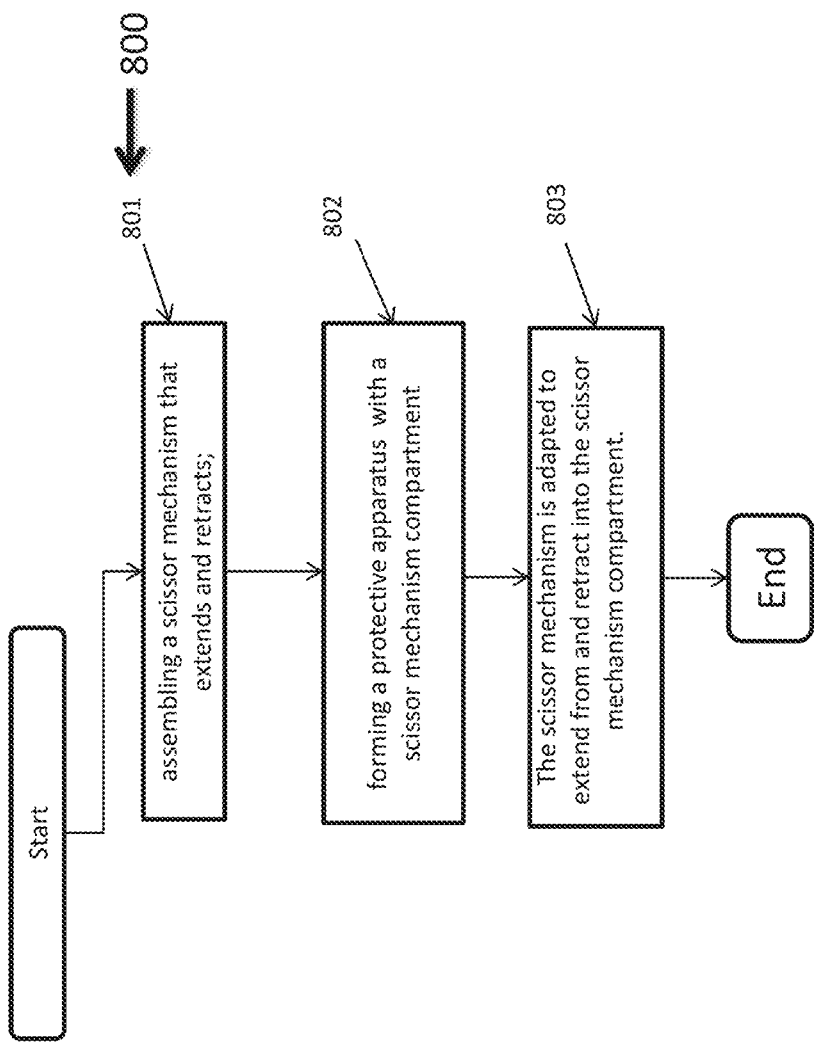
FIG. 8 is a flowchart of an exemplary process for manufacturing a protective apparatus adapted for covering a camera equipped mobile device and having an extendable arm, in accordance with an embodiment of the present invention.

Reference is now made to FIG. 8, a flowchart of an exemplary process 800 for manufacturing a protective apparatus adapted for covering a camera equipped mobile device and having an extendable arm, according to some embodiments of the present invention.

As shown in 801, a scissor mechanism that extends and retracts is assembled. The scissor mechanism comprises scissor arms that are pivotally connected together in a criss cross "X" pattern As shown in 802, a protective apparatus is formed, comprising a back plane, a first and a second side that are laterally opposed to each other, with a scissor mechanism compartment comprising at least one sidewall and a bottom of the backplane.

The protective apparatus is formed to attach to the camera equipped mobile device. When the protective apparatus is attached to the camera equipped mobile device, a back of a housing of the camera equipped mobile device is placed against a top of the back plane and the lateral sides of the housing are placed against the first and second sides.

As shown in 803, the scissor mechanism is adapted to extend from and retract into the scissor mechanism compartment in parallel to the back plane.

Optionally, the scissor mechanism is attached to the protective apparatus with a joint that is adapted to support rotation of the scissor mechanism relative to the backplane.

Optionally, the joint is at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation between the scissor mechanism and the protective apparatus.

Optionally, the protective apparatus is manufactured by molding, casting, forming, three dimensional printing, machining, joining, additive manufacturing, and/or any other manufacturing process for producing a protective apparatus.

Optionally, the protective apparatus is manufactured from silicon, rubber, metal, plastic, and/or any other material for producing a protective apparatus.

Optionally, the camera equipped mobile device comprises a Smartphone, android device, Apple iPhone, digital camera, portable digital assistant, cellular phone, location aware device, and/or any other electronic device that is equipped with a camera.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant apparatus for holding/protecting a camera equipped mobile device will be developed and the scope of the term protective apparatus is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A protective apparatus adapted for covering a mobile device and having an extendable arm, comprising:
    a protective apparatus sized and shaped for being attached to a camera equipped mobile device and having a back plane and first and second sides which are laterally opposing one another;
    a scissor mechanism compartment formed by at least one sidewall and a bottom of said backplane;
    a scissor mechanism adapted to be manually extended from and manually retracted into said scissor mechanism compartment along an extension axis; and
    a spring clip attached to a proximal end of said scissor mechanism by a joint, wherein when said scissor mechanism is retracted into said scissor mechanism compartment, said spring clip is rotated on said joint and clasps around said protective apparatus side;
    wherein when said protective apparatus is attached to said camera equipped mobile device, a back of a housing of said camera equipped mobile device is placed against a top of said back plane and said lateral sides of said housing are placed against said first and second sides.

2. The method of claim 1, wherein said scissor mechanism is attached to said protective apparatus with a joint, said joint adapted to support an angular adaptation of said extension axis of said scissor mechanism in relation to said backplane.

3. The device of claim 2, wherein said joint is at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation between said scissor mechanism and said protective apparatus.

4. The device of claim 1, wherein said scissor mechanism compartment further comprises a back plate with an integrally formed slot, and said spring clip is stowed into said slot when clasped around said protective apparatus side.

5. The device of claim 1, wherein said scissor mechanism compartment further comprises a second sidewall laterally opposed to said sidewall, and third and fourth sidewalls laterally opposed to one another and perpendicular to said second sidewall.

6. The device of claim 1, further comprising a joint holder connecting between said joint and said protective apparatus, said joint holder composed of a sufficiently rigid material to prevent said joint from detaching from said protective apparatus during normal usage.

7. The device of claim 1, wherein when said scissor mechanism is extended, said spring clip is rotated on said joint forming an extension handle to said extended scissor mechanism.

8. The device of claim 1, wherein said joint attached to said spring clip is at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation between said scissor mechanism and said spring clip.

9. The device of claim 1, wherein said protective apparatus is integrally formed to encase a camera equipped mobile device chosen from a collection of camera equipped mobile devices comprising a digital camera Smartphone, an iPhone, or any other camera equipped mobile device.

10. The device of claim 1, further comprising a third and fourth side of said protective apparatus which are laterally opposing one another and perpendicular to said first and second sides.

11. The device of claim 1, wherein at least one button to operate said camera equipped mobile device is located in at least one structure selected from a collection of structures comprising said scissor mechanism and said spring clip.

12. The device of claim 1, wherein said scissor mechanism is detachable from said protective apparatus.

13. The device of claim 1, wherein said scissor mechanism compartment is detachable from said protective apparatus.

14. The device of claim 1, wherein said scissor mechanism is detachable from said protective apparatus together with said scissor mechanism compartment when said scissor mechanism is retracted into said scissor mechanism compartment.

15. A method for manufacturing a protective apparatus adapted for covering a mobile device and having an extendable arm, comprising:
    assembling a scissor mechanism that extends and retracts;
    forming a protective apparatus comprising a back plane, a first and a second side which are laterally opposing one another, and a scissor mechanism compartment formed by at least one sidewall and a bottom of said backplane;
    said protective device formed for being attached to a camera equipped mobile device wherein when said protective apparatus is attached to said camera equipped mobile device, a back of a housing of said camera equipped mobile device is placed against a top of said back plane and said lateral sides of said housing are placed against said first and second sides;

attaching said scissor mechanism to said protective apparatus;

attaching to said scissor mechanism a spring clip attached to a proximal end of said scissor mechanism by a joint, wherein when said scissor mechanism is retracted into said scissor mechanism compartment, said spring clip is rotated on said joint and clasps around said protective apparatus side; and wherein said scissor mechanism is adapted to be manually extended from and manually retracted into said scissor mechanism compartment along an extension axis.

16. The method of claim 15, wherein said scissor mechanism is attached to said protective apparatus with a joint, said joint adapted for supporting an angular adaptation of an extension axis of said scissor mechanism in relation to said backplane.

17. The method of claim 15, wherein said joint is at least one member of a group of joiners comprising a hinge, a two axis hinge, a living hinge, a hinge with moving components, a hinge made of flexible material, a flexible portion with a rigid structure, a mechanical joint, a universal joint, and any other joint that allows rotation between said scissor mechanism and said protective apparatus.

18. The method of claim 15, wherein said protective apparatus is manufactured by a process selected from a group of manufacturing processes comprising molding, casting, forming, three dimensional printing, machining, joining, additive manufacturing, and any other manufacturing process for producing a protective apparatus.

19. The method of claim 15, wherein said protective apparatus is manufactured from a material selected from a group of materials comprising silicon, rubber, metal, plastic, and any other material for producing a protective apparatus.

20. The method of claim 15, wherein said camera equipped mobile device comprises any member of a group of mobile devices including Smartphones, android devices, iPhones, digital cameras, portable digital assistants, cellular phones, location aware devices, and any other electronic device that is equipped with a camera.

* * * * *